United States Patent [19]

Ramme

[11] 4,250,651
[45] Feb. 17, 1981

[54] LIGHTED FISH LURE

[76] Inventor: Clarence Ramme, 65 G, Aurora, Minn. 55705

[21] Appl. No.: 14,866

[22] Filed: Feb. 26, 1979

[51] Int. Cl.³ ............................................. A01K 85/01
[52] U.S. Cl. ................................... 43/17.6; 43/42.35
[58] Field of Search ...................... 43/17.5, 17.6, 42.35

[56] References Cited

U.S. PATENT DOCUMENTS

| | | | |
|---|---|---|---|
| 2,002,135 | 5/1935 | Barton | 43/17.6 |
| 2,740,220 | 4/1956 | Caplan | 43/17.6 |
| 2,754,610 | 7/1956 | Carlson | 43/17.6 |
| 3,034,249 | 5/1962 | Hawks | 43/42.35 |
| 3,040,462 | 6/1962 | Guida | 43/17.6 |
| 3,621,600 | 11/1971 | Dworski | 43/17.6 |
| 4,109,405 | 8/1978 | Ito | 43/17.5 |

*Primary Examiner*—Nicholas P. Godici
*Attorney, Agent, or Firm*—Wicks & Nemer

[57] ABSTRACT

The invention includes an elongated central body portion having an elongated air chamber formed therein and a battery chamber parallelly disposed to and spaced from the air chamber, both chambers extending substantially the length of the central body portion. A rear cap is removably secured to the rear end of the central body portion and a translucent front section is threadedly connected to the front end of the central body portion. At least one battery is mounted in the battery chamber. A light bulb has the base thereof in abutment with a shoulder formed at the outer end of the battery chamber whereby the bulb portion extends into the translucent front section. A coil spring is mounted between the rear end of the battery and the rear cap so that when the rear cap is secured to central body portion contact is made between the light bulb and the battery.

1 Claim, 3 Drawing Figures

LIGHTED FISH LURE

SUMMARY

The invention relates to an improvement in fishing lures and more particularly to the so called plug type which may be used in fishing at night. It is an object of the invention to provide a fishing lure the head or front portion of which is lighted whereby the same may be easily sighted at night and which attracts fish at night or in the daytime. The lure body has an internal chamber for batteries which when used cause the lure to sink for use in deep water fishing, and without the batteries the lure can be used as a surface bait. The lure body is also formed with an air chamber extending parallel to and spaced from the battery chamber which without the batteries causes the lure to float. With the battery chamber extending substantially the length of the lure body and battery chamber a horizontal balance is maintained.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
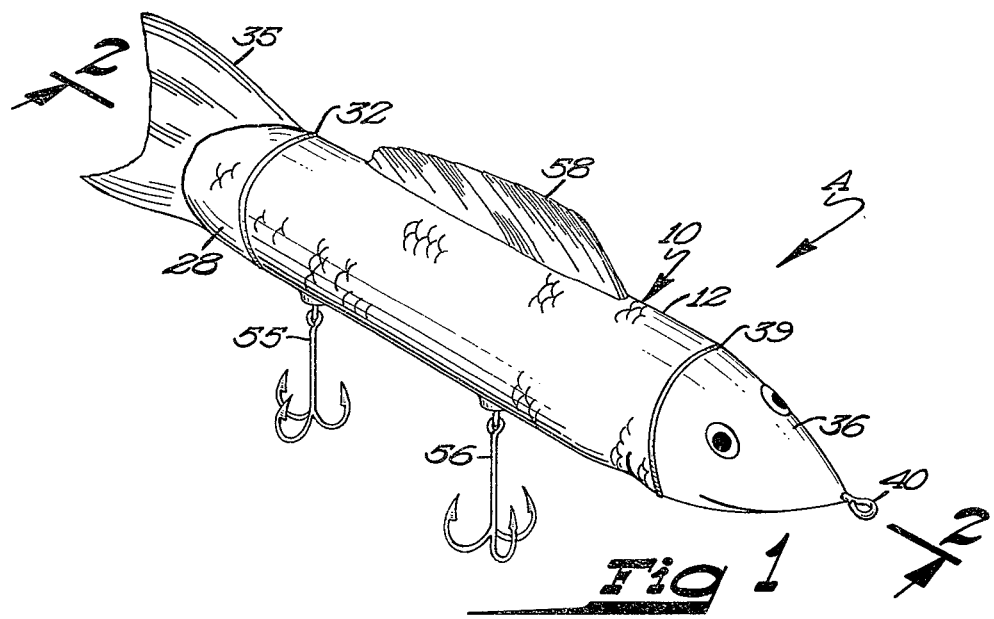
FIG. 1 is a perspective view of a lighted fishing lure embodying the invention.
Figure 2:
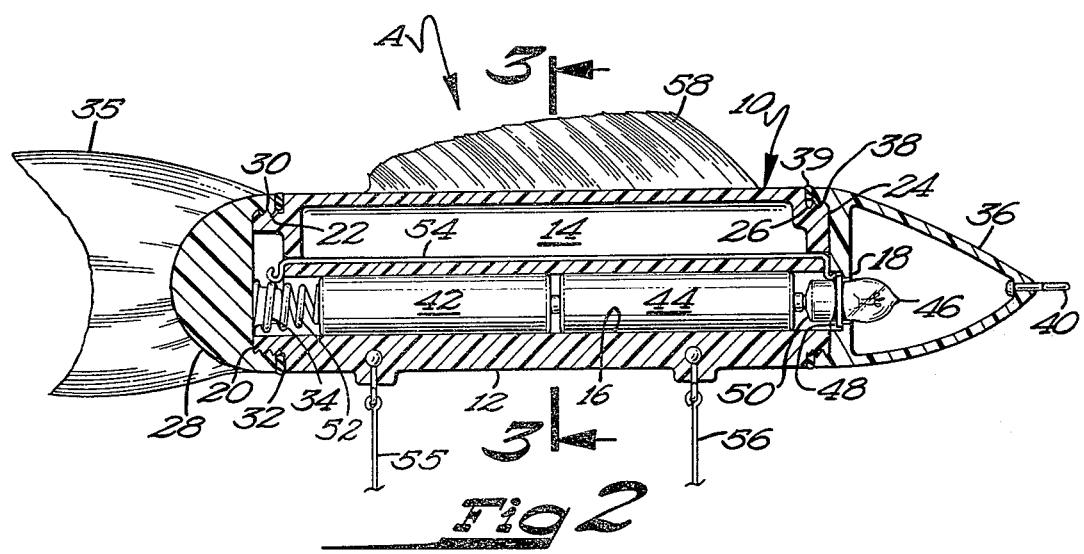
FIG. 2 is a longitudinal sectional view on the line 2—2 of FIG. 1.
Figure 3:
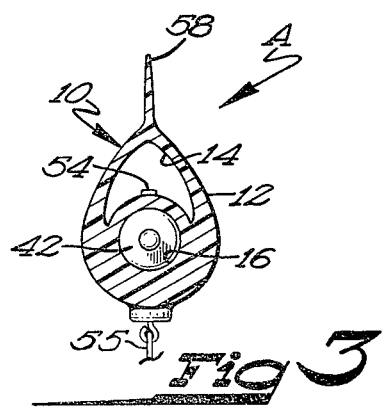
FIG. 3 is a sectional view on the line 3—3 of FIG. 1.

Referring to the drawings id detail, the fishing lure A includes the elongated hollow body 10 which includes the tubular central body section 12 in which is formed the sealed elongated air chamber 14. The central body section also includes the elongated hollow cylindrical chamber 16 which extends throughout the length of the central body portion. The forward end of the chamber 16 is formed with the shoulder 18. With the air chamber positioned above the battery chamber 16 the lure floats upright in the water.

The rear end of the central body portion 12 is formed with the reduced annular portion 20 which is threaded on the external surface as at 22. Also the forward end of the central body portion is formed with the reduced annular portion 24 which is threaded on the external surface as at 26. The numeral 28 designates a rear cap which is substantially half spherical in formation with the annular extension 30 which is threaded on the internal surface thereof and engageable with threads 22 of the reduced portion 20 of the central body portion 12. A sealing engagement of the rear cap 28 with the end of the central portion by means of the gasket 32. Formed on the internal surface of the rear cap 28 is the peg 34 and formed externally on the section 28 is the tail fin 35.

The numeral 36 designates a hollow front section which has the threaded annular recess 38 which threadedly engages with the threads 26 of the front end of the central portion 12. The front section 36 is formed of translucent plastic. Mounted on the front end of the section 36 is the eye 40.

Further provided are the batteries 42 and 44 which are positioned within the chamber 16 together with the bulb 46 having the collar 48 formed on the base 50. The bulb 46 extends outwardly of the chamber 16 and into the front portion 36 but is held against displacement by the collar 48 of the bulb in abutment with the shoulder 18 of the chamber 16. The batteries are urged into contact with each other and the base of the bulb by means of the coil spring 52 positioned on the peg 34 and interposed between the rear cap 28 and the end of the battery 42. A wire 54 is connected to the bulb base and the spring 52 to complete the circuit for lighting the bulb.

Secured to the underside of the central body portion are the pair of spaced fish hooks 55 and 56 and formed on the top of the lure central portion is the dorsal fin 58. In using the lure a fish line is connected to the eye 40.

Having thus described the invention, what is claimed as new and desired to be secured by Letters Patent is:

1. A lighted fish lure comprising:
   (a) a single elongated body having
   (b) a central portion,
   (c) said central portion having an air chamber formed in substantially the upper half portion thereof and extending substantially the length thereof, and
   (d) a battery chamber parallelly disposed to and alongside a portion of said air chamber in substantially the lower half portion of said central portion and spaced from and independent of said air chamber,
   (e) said body having a rear cap,
   (f) means for removably connecting said rear cap to the rear end of said body,
   (g) said central portion having a hollow translucent front section,
   (h) means mounting a light bulb to extend partially into said front section,
   (i) at least one battery mounted in said battery chamber, and
   (j) means urging said battery into contact with said light bulb to light the same when said rear cap is connected to said central body portion.

* * * * *